(12) United States Patent
Bruder et al.

(10) Patent No.: US 7,237,823 B2
(45) Date of Patent: Jul. 3, 2007

(54) ADJUSTABLE COVER ELEMENT AND ADJUSTABLE VEHICLE ROOF FOR A CONVERTIBLE VEHICLE

(75) Inventors: Gernot Bruder, Karlsruhe (DE); Jan Hesse, Bietigheim-Bissingen (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 59 days.

(21) Appl. No.: 11/284,328

(22) Filed: Nov. 21, 2005

(65) Prior Publication Data

US 2006/0138800 A1    Jun. 29, 2006

(30) Foreign Application Priority Data

Nov. 25, 2004  (DE) .................. 10 2004 057 061
Dec. 10, 2004  (DE) .................. 10 2004 059 793

(51) Int. Cl.
*B60J 7/20*    (2006.01)
(52) U.S. Cl. ................. 296/107.08; 296/136.06

(58) Field of Classification Search .......... 296/107.08, 296/136.06, 136.05
See application file for complete search history.

(56) References Cited

FOREIGN PATENT DOCUMENTS

DE       101 63 727       7/2003
DE       102. 37 363      3/2004

*Primary Examiner*—Joseph D. Pape
(74) *Attorney, Agent, or Firm*—Brooks Kushman P.C.

(57) ABSTRACT

An adjustable cover element in a vehicle is mounted to a vehicle component via a multiple linkage kinematic system comprising two guide rods. Each guide rod on one end is coupled in an articulated manner to the vehicle component and on the other end is coupled in an articulated manner to the cover element. One guide rod for the multiple linkage kinematic system has a two-part design and comprises two guide rod sections connected by an articulated joint. A stop is provided which during a relative motion between the cover element and the stop acts on a guide rod section in such a way that the angular position between the two guide rod sections changes.

21 Claims, 7 Drawing Sheets

ADJUSTABLE COVER ELEMENT AND ADJUSTABLE VEHICLE ROOF FOR A CONVERTIBLE VEHICLE

CROSS-REFERENCE TO RELATED APPLICATIONS

This application claims priority to German application no. 102004057061.2, filed Nov. 25, 2004 and German application no. 102004059793.6, filed Dec. 10, 2004.

BACKGROUND OF THE INVENTION

1. Field of the Invention

The invention relates to an adjustable cover element in a vehicle, in particular a convertible vehicle, and an adjustable vehicle roof.

2. Background Art

A multisection hard-top vehicle roof is disclosed in German published application DE 102 37 363 A1, the roof sections of which may be adjusted between a closed position covering the vehicle interior in which the roof sections form a common, continuous outer roof skin, and a stored position in which the roof sections are folded away in a rear storage compartment. A rear shelf section is located directly below the rear roof section in the closed position of the vehicle roof. The rear shelf section assumes an approximately horizontal stored position and is situated above the storage compartment in which the roof sections are stored in the open position of the vehicle roof. The rear shelf section is designed to be adjustable, and has its own kinematic control system by which the rear shelf section is pivotably coupled to the vehicle body. The rear shelf section is moved into an approximately upright intermediate position as soon as the vehicle roof is to be switched from one end position to the opposite end position to enable the transitional motion of the roof sections between the closed and stored positions to be carried out and to avoid a collision with the rear shelf section. In the intermediate position of the rear shelf section the roof sections may be switched between the closed and stored positions along the planned path of motion without the danger of collision. The rear shelf section once again assumes its approximately horizontal covered position after reaching the particular end position. The kinematic control systems of the rear shelf section and the vehicle roof may be actuated independently of one another, or may also be kinematically coupled, so that actuation of the roof kinematic system automatically adjusts the rear shelf section as well.

A loading assistance function may be employed in which the stored and stacked roof sections are lifted as a roof section bundle before or during opening of the trunk to enable optimum use of the remaining trunk space when the vehicle roof is open. The loading assistance function allows the space beneath the roof section bundle to be more accessible and more easily loaded. When the roof section bundle is lifted, however, care must be taken that a collision is avoided with the rear shelf section located thereabove. This requires that the rear shelf section be in the most horizontal position possible, in contrast to the steep intermediate position during roof storage.

A roof hatch is disclosed in published German application DE 101 63 727 A1 which is connected in an articulated manner to the vehicle body via multiple two-part guide rods. Each of the two-part guide rods are formed from one articulated lever and one additional lever. The two-part guide rods may be swiveled between a lower end position (roof hatch closed) and an upper end position (roof hatch open). The two guide rod sections of the two-part guide rods move relative to one another during the overall swivel motion between the two end positions. Further swiveling of the guide rods is prevented in each case by two stops. The stops block further motion of both guide rod sections and further motion of the upper end position of the two-part guide rods, the two-part guide rods.

German published application DE 101 63 727 A1 describes a hard-top vehicle roof comprising a roof kinematic system with two guide rods which have a common articulated joint. One guide rod connects a front roof section to the body in an articulated manner. The relative angular position of the guide rods with respect to one another continuously changes during the overall swiveling process of the roof kinematic system. A rotational motion of both guide rods about the common articulated joint is possible in both directions.

SUMMARY OF THE INVENTION

One aspect of the present invention is to improve, using simple design measures, the possibilities for adjusting a cover element in a vehicle or a vehicle roof. In particular, a multiple linkage kinematic system is provided for such a cover element or vehicle roof that has a simple design and is characterized by additional motion and adjustment possibilities.

The cover element is mounted on a vehicle component, the vehicle body, for example, by means of a multiple linkage kinematic system. The kinematic system comprising two guide rods, each of which on one end is coupled in an articulated manner to the affected vehicle component, and on the other end is coupled in an articulated manner to the cover element. One of the guide rods has a two-part construction in which the two guide rod sections are rotatably coupled via an articulated joint. The articulated joint between two guide rod sections allows the angular position between the guide rod sections to change that also changes the position of the cover element supported by the guide rods. For example, the cover element may be moved between a starting position and an end position by the multiple linkage kinematic system in a controlled motion. A stop may be provided in the region of the path of motion of the two-part guide rod. The two-part guide rod moves relative to the stop. If a guide rod section contacts the stop—or in the case of a stationary multiple linkage kinematic system, if the stop contacts a guide rod section—the relative angular position between the two guide rod section changes and also changes the position of the cover element. In this manner it is possible, using simple measures, to change the position of the cover element. For example, it is possible to change the position of the cover element by lifting the rear edge of the cover element, thus enabling adjustments to the given control situations. This change in position of the cover element occurs without an additional drive, using only passive measures such as the positioning of the stop in the path of motion of the two-part guide rod without additional energy consumption.

The rotational motion of the articulated joint situated between the two guide rod sections is advantageously limited in one rotational direction by an articulated stop provided directly on one or both guide rod sections. Relative motion between the two guide rod sections is limited to only one of two potential rotational directions. Limiting relative motion is advantageous for motion situations in which the guide rod sections do not yet contact the external stop.

During this phase of motion, the guide rod sections may be subjected to force, for example by means of their intrinsic weight or by a spring element, in the rotational direction that is blocked by the articulated stop. The spring element advantageously overlaps the articulated joint situated between the guide rod sections and is connected to each of the two guide rod sections to create an autonomous design in which no additional points of applied force outside the multiple linkage kinematic system are necessary.

One multiple linkage kinematic system designed in this manner has one additional degree of freedom on account of the articulated joint between the two guide rod sections. During normal motion of the multiple linkage kinematic system this degree of freedom is restricted by the spring element or the intrinsic weight. The two-part guide rod acts as a one-part guide rod during this phase of motion and the two guide rod sections maintain their relative angular position with respect to one another. This guide rod section cannot change its angular position with respect to the adjacent guide rod section until the stop acts on one of the guide rod sections against the force of the spring element (or the intrinsic weight). The elastic force, or the intrinsic weight, causes the two guide rod sections to once again assume their starting position as soon as the stop no longer acts on the guide rod section.

Embodiments are also possible in which the starting position of the two guide rod sections is rectilinear, or also in which an angle is formed between two guide rod sections without action by the external stop. In a rectilinear starting position, the relative angle between the two guide rod sections is not achieved until one of the guide rod sections contacts the stop. This shortens the distance between the oppositely situated end points of the respective guide rod sections.

Conversely, a straight position, or at least a position with a small relative angle, may be achieved for an angular starting position between the two guide rod sections when the stop is contacted. The straight position increases the distance between the oppositely situated end points of both guide rod sections.

According to another aspect of the invention, the vehicle roof is used in a convertible vehicle that may be adjusted between a closed position in which the vehicle interior is covered, and a stored position in which the vehicle roof is folded away in a rear storage compartment. In one embodiment, the vehicle roof and a guide rod section of the two-part guide rod for the multiple linkage kinematic system for the cover element are coupled for controlled motion. When the vehicle roof is switched between its two end positions, one of the guide rod sections of the cover element comes into contact with the stop, causing this guide rod section to change its relative angular position with respect to the second guide rod section. The position of the cover element supported by the multiple linkage kinematic system changes to provide space for the transitional motion of the vehicle roof. The additional controlled motion of the cover element occurs in an exclusively passive manner, and no active actuators are necessary for this purpose. The additional degree of freedom is activated solely by the controlled motion of the vehicle roof.

In another embodiment, the coupling is provided between the roof kinematic system and the rigid guide rod for the cover element. In this case, contact with the stop does not occur until the cover element moves in the direction of the loading assistance position for a stored roof. The stop is controlled to free the path for the rear shelf section guide rod for the roof folding-away motion, and ensures a steeper intermediate position of the rear shelf section for the collision-free roof motion.

The controlled motion of the vehicle roof is advantageously the previously described transitional motion between the closed and stored positions. Alternatively, a lifting motion of the vehicle roof stowed in the storage compartment may be used to provide a loading assistance function. The loading assistance function may be provided in which the vehicle roof stacked in a bundle is lifted when the trunk is opened in order to facilitate access to the trunk and the remaining storage space beneath the roof section bundle.

The cover element is a rear shelf section, for example, may contact the rear seatback when the vehicle roof is closed, and may be disposed directly beneath the rear roof section. The rear shelf section is located in a position above the stored roof section bundle when the vehicle roof is stored. The cover element may also be the lid of the cover storage compartment.

The kinematic systems of the vehicle roof and the cover element may be kinematically coupled, so that during the controlled motion of the vehicle roof the cover element also automatically undergoes a controlled motion. According to one advantageous embodiment, during this controlled motion one of the guide rod sections of the two-part guide rod of the multiple linkage kinematic system for the cover element may contact the stop or the stop may contact the guide rod section to change the relative angular position between the two guide rod sections.

The roof kinematic system and the multiple linkage kinematic system for the cover element may be coupled via a control cylinder. The control cylinder remains unactuated during a defined phase of motion of the vehicle roof and ensures a rigid motion transfer between the roof kinematic system and the multiple linkage kinematic system for the cover element. The control cylinder is not actuated until during a further phase of motion in which the cover element is adjusted independently of the state of motion of the vehicle roof. This occurs in particular after the vehicle roof has reached its storage position in the region of the rear of the vehicle. The cover element is then able to assume its final position by actuation of the control cylinder, while the roof remains in its stored position.

BRIEF DESCRIPTION OF THE DRAWINGS

Further advantages and useful embodiments are contained in the additional claims, the description of the figures, and the drawings, which show the following:

Identical components are provided with identical reference numbers in the figures.

DETAILED DESCRIPTION OF THE PREFERRED EMBODIMENT(S)

Figure 1:
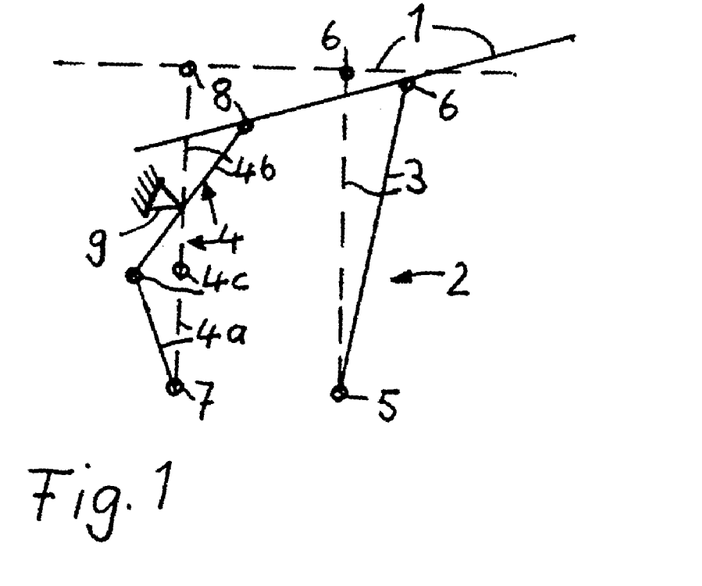
FIG. 1 is a schematic illustration of a cover element held by a multiple linkage kinematic system wherein one guide rod of the multiple linkage kinematic system having a two-part design and comprising two guide rod sections connected by an articulated joint, is shown in the undeflected position, i.e., in a raised intermediate position (dashed line), and in the deflected position (solid line)

A cover element 1 in a vehicle is illustrated in two different positions in FIG. 1. The cover element 1, for example, is a rear shelf section in a convertible vehicle which is horizontally stored beneath the rear roof section in the vehicle interior when the vehicle roof is closed. The cover element 1 at least partially covers a storage compartment when the vehicle roof is stored. In principle, however, other applications of the invention in vehicles may be considered, such as a storage compartment lid, a trunk lid, or the like.

The cover element 1 is held by a multiple linkage kinematic system 2 comprising two guide rods 3 and 4, which on one end are connected via articulated joints 5 and 7, respectively, to an additional vehicle component, and on the other end are rotatably connected via articulated joints 6 and 8, respectively, to the cover element 1. The articulated joints 5 and 7 are on the side of the guide rods 3 and 4 facing away from the cover element 1 and act as base points. The articulated joints 5 and 7 may be coupled either to the vehicle body or to another vehicle component, for example, a movable component such as a transmission kinematic system or the like.

The guide rod 3 is rigidly designed. The guide rod 4 has a two-part design and has two guide rod sections 4a and 4b pivotably connected by a further articulated joint 4c. The lower joint section 4a with the articulated joint 7 faces the additional vehicle component. The upper guide rod section 4b on its end face with the articulated joint 8 is pivotally connected to the cover element 1. The additional articulated joint 4c between the two guide rod sections 4a and 4b provides one additional degree of freedom for the multiple linkage kinematic system 2. The kinematic system allows the two guide rod sections 4a and 4b to undergo an angular change relative to one another when one of the two guide rod sections, such as the upper guide rod section 4b, for example, contacts a stop 9.

In the exemplary embodiment shown in FIG. 1, the dashed line represents the starting situation or the already raised intermediate position at the time the stop for the multiple linkage kinematic system is contacted. In this condition, the two guide rod sections 4a and 4b are coaxially aligned with respect to one another. In the illustration position, deflection about the rotary joint 4c has not yet occurred. The solid line represents the situation after the upper guide rod section 4b strikes the stop 9. The stop 9 prevents the swivel motion of the guide rod 4 about the articulated joint 7 in the counterclockwise direction. As a result, when the guide rod 4 moves about the rotary joint 7 in the counterclockwise direction only the lower guide rod section 4a can perform this motion. The upper guide rod section 4b remains on the stop 9 or slides along the stop, which causes the two guide rod sections 4a and 4b to form an increasingly larger angle with respect to one another as the lower guide rod 4b continues to move. This relative motion is transmitted to the cover element 1 and the additional guide rod 3, which is deflected in the clockwise direction after the guide rod section strikes the stop 9. As a result, the cover element assumes a different angular position than when the guide rod section is not deflected about the rotary joint 4c. In the exemplary embodiment, the right edge of the cover element 1 shown in the illustration is raised with respect to the undeflected position.

Figure 2:
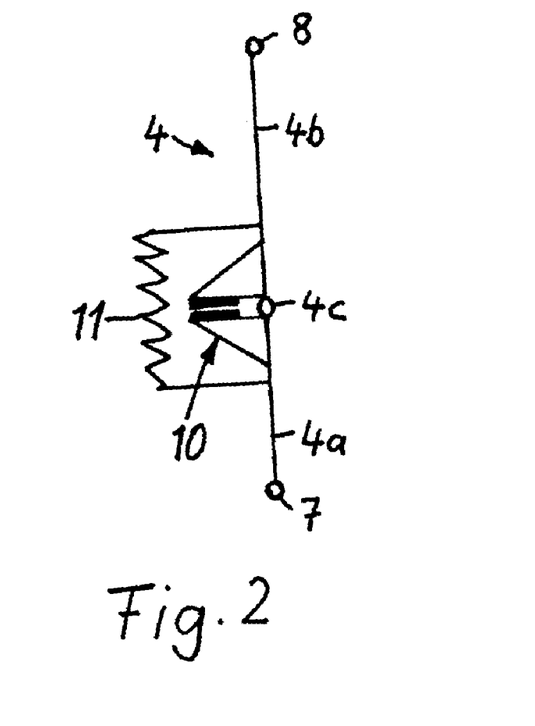
FIG. 2 is a schematic illustration of the two guide rod sections of the two-part guide rod.

The guide rod 4 may be designed according to the configuration illustrated in FIG. 2 to restrict the additional degree of freedom which results from the guide rod 4 having a two-part design and an additional articulated joint 4c between the two guide rod sections 4a and 4b. An articulated stop 10 is provided that blocks relative torsion between the two guide rod sections 4a and 4b in one swivel direction, and allows such only in the opposite direction. The rotational motion in the opposite direction is arrested by a spring element 11 which spans the articulated joint 4c and connects the two guide rod sections 4a and 4b. The spring element 11 also exerts force against the articulated stop 10. In the exemplary embodiment according to FIG. 2, relative motion of the upper guide rod section 4b about the rotary joint 4c in the counterclockwise direction is prevented by the articulated stop 10. A relative swivel motion in the clockwise direction is possible, but to accomplish this the force of the spring element 11, for example, a tension spring, must be overcome.

Figure 3:
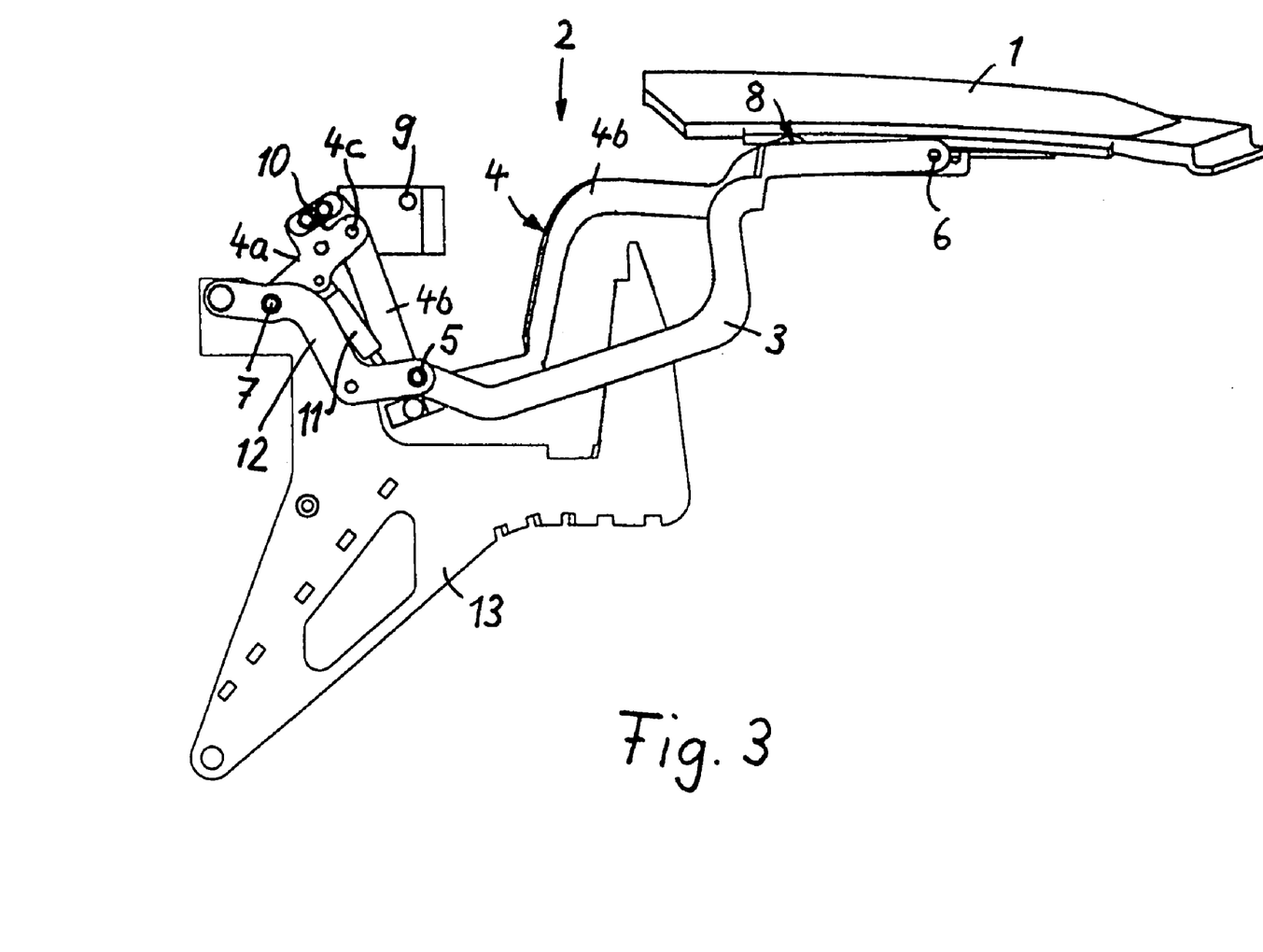
FIG. 3 is a perspective illustration of a cover element designed as a rear shelf section that is supported by the multiple linkage kinematic system having a two-part guide rod, shown in the convertible position of the vehicle.
Figure 4:
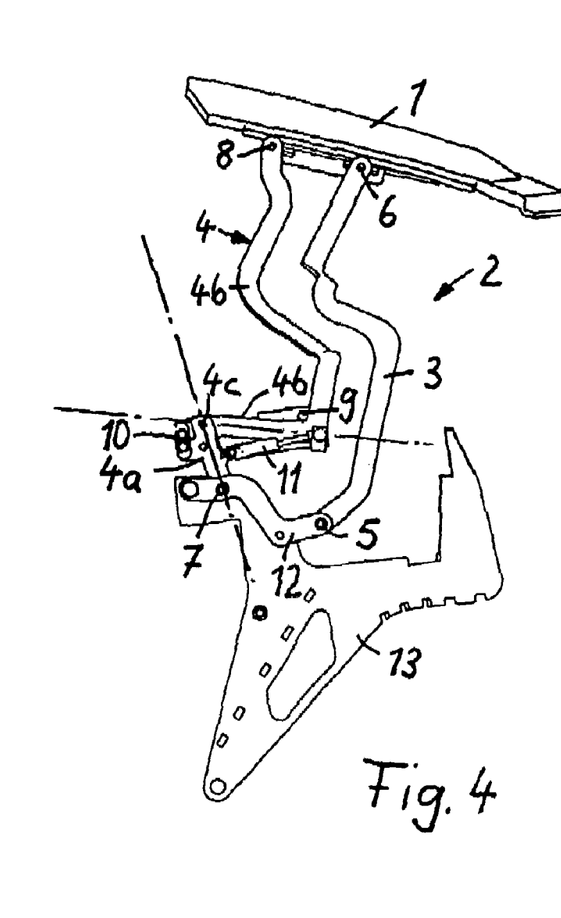
FIG. 4 is the rear shelf section of FIG. 3 in a raised position, wherein a guide rod section of the two-part guide rod contacts a stop.
Figure 5:
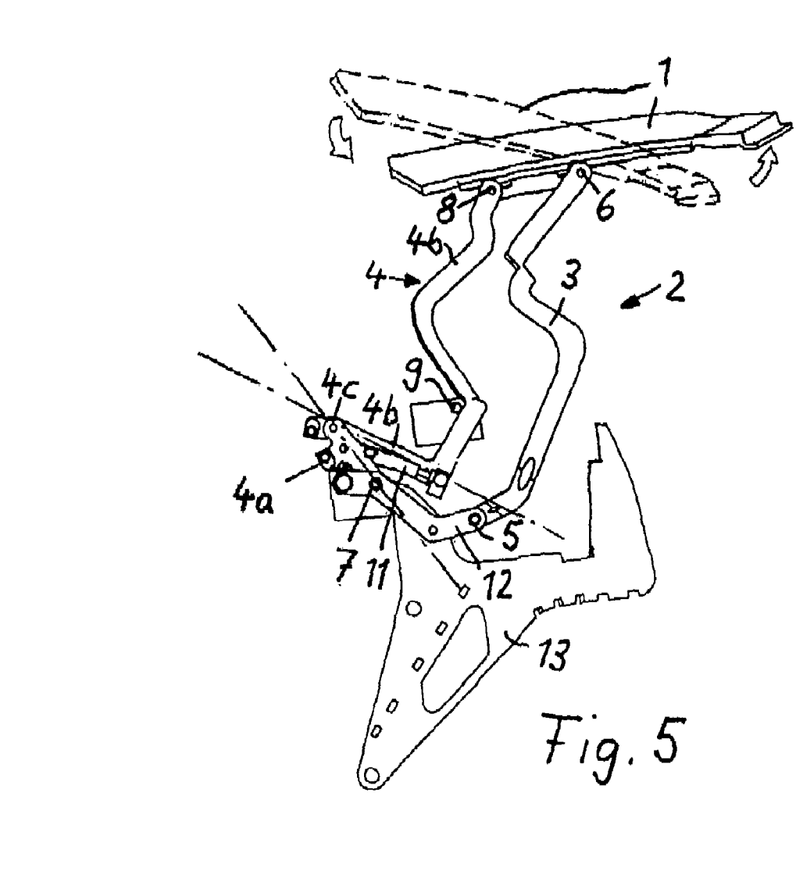
FIG. 5 is the rear shelf section in a further raised position, with a changed angular position between the two guide rod sections of the two-part guide rod.

FIGS. 3 through 5 show an exemplary embodiment for a cover element 1 designed as a rear shelf section, which is provided with the multiple linkage kinematic system 2 having a one-part guide rod 3 and a two-part guide rod 4. The base points of guide rods 3 and 4—articulated joints 5 and 7—are mounted on a support rod 12 which is pivotably supported on a bracket 13. The two guide rod sections 4a and 4b have very different lengths, and guide rod 4b has multiple bends. The spring element 11 situated between the two guide rod sections 4a and 4b is designed as a pneumatic spring which exerts force on the two guide rod sections 4a and 4b in such a way that guide rod section 4b attempts to swivel about the connecting articulated joint 4c in the counterclockwise direction. However, this relative swivel motion is limited by the stop 10 between the two guide rod sections 4a and 4b.

FIG. 3 illustrates the cover element 1 in a first end position. In a raising motion, starting from the position according to FIG. 3 in which the multiple linkage kinematic system 2 is raised in the counterclockwise direction, a recess in the upper guide rod section 4b makes contact with a stop 9, as illustrated in FIG. 4. The stop 9 blocks further motion of the upper guide rod section 4b, thereby reducing the relative angular position between the two guide rod sections 4a and 4b as the lower guide rod section 4a continues to swivel about its articulated joint 7. This change in angle can be seen by comparing FIGS. 4 and 5, where in each case the longitudinal axes through the guide rod sections 4a and 4b are represented by the connecting articulated joint 4c. This change in angle between the two guide rod sections 4a and 4b results in a change in the position of the cover element 1 by lifting its rear edge. Otherwise, i.e., without a change in the relative angular position between the guide rod sections 4a and 4b, the rear edge of the cover element 1 would be situated in a lower position, as illustrated by dashed lines in FIG. 5. The lifted rear edge of the cover element 1 covers, for example, a stored roof section bundle. The roof section bundle may be lifted to achieve a loading assistance function. Collisions are prevented between the cover element 1 and the roof section bundle to be lifted.

Figure 6:
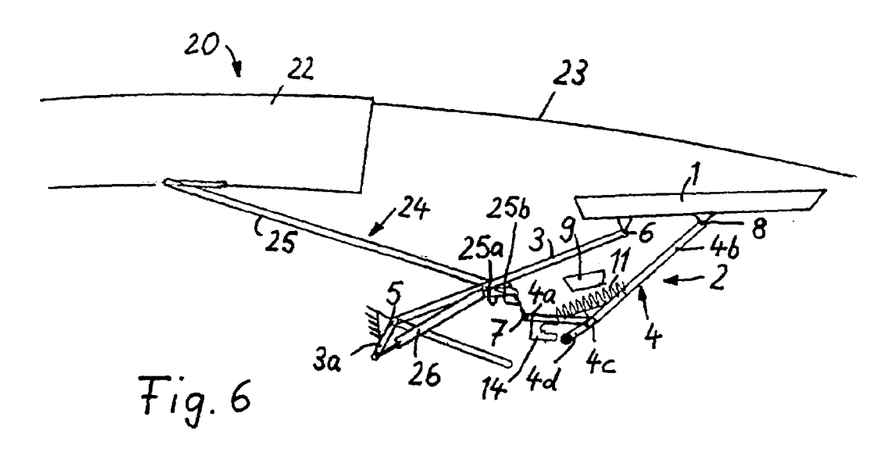
FIGS. 6 through 10 are an illustration of a multisection, lowerable vehicle roof, in addition to a cover element designed as a rear shelf section and held by the multiple linkage kinematic system, in various states or phases of motion between the closed roof position (FIG. 6), stored roof position (FIG. 9), and a loading assistance position (FIG. 10)

FIGS. 6 through 10 illustrate an adjustable vehicle roof 20 of a convertible vehicle in addition to a cover element 1 designed as a rear shelf section. In FIG. 6 the vehicle roof 20 is shown in its closed position, in which the roof sections cover the vehicle interior. The vehicle roof 20 is designed as a hard-top roof having a total of three rigid roof sections, of which the center roof section 22 and the rear roof section 23. The front roof section 21 is shown in the stored position or loading assistance position in FIGS. 7 through 10.

As can further be seen from FIG. 6, the vehicle roof 20 is pivotably coupled to the vehicle body via a roof kinematic system 24, of which a main guide rod 25 is illustrated. The main guide rod 25 is pivotably connected to the vehicle body via a rotary joint, a section 25a branches off from the rotary joint to the main guide rod 25. A kinematic coupling with the multiple linkage kinematic system 2 for the cover element 1 is achieved by the main guide rod 25. This kinematic coupling is implemented with the assistance of a control cylinder 26, which on one end is connected in an articulated manner to section 25a of the main guide rod, and on the other end is connected in an articulated manner to a section 3a of the guide rod 3 for the multiple linkage kinematic system 2 for the cover element 1. Section 3a branches off from the rotary joint 5 fixed to the body, via which the guide rod 3 having a one-part design is connected on the side facing away from the cover element 1.

The two-part guide rod 4 for the multiple linkage kinematic system 2 is coupled via the rotary joint 7 to an additional section 25b of the main guide rod 25 for the roof kinematic system 24, on the side facing away from the cover element 1 in the region of the lower guide rod section 4a. The one-part guide rod 3 for the multiple linkage kinematic system 2 is held fixed to the body, whereas the two-part guide rod 4 is connected directly to the roof kinematic system.

Also illustrated is the stop 9, which in this exemplary embodiment is rigidly mounted on the body and is guided against the two-part guide rod 4 when the multiple linkage kinematic system 2 moves.

A sliding element 14 is movably mounted on the lower guide rod section 4a of the two-part guide rod 4 for the multiple linkage kinematic system 2. The sliding element 14 has a detent jaw designed to receive a ball head at a section 4d, section 4d being designed as one piece with the upper guide rod section 4b but extending beyond the connecting articulated joint 4c, on the side facing away from the cover element 1. The sliding element 14 is to be moved by means of a suitable drive—typically actuated using a Bowden cable from the kinematic system for the trunk lid—from the returned position illustrated in FIG. 1 to a locked position in the direction of the connecting articulated joint 4c. In the locked position, for a suitable relative angle between the guide rod sections 4a and 4b, the ball head on section 4d protrudes into the receptacle on the sliding element. In the protruding position (FIG. 10) the two guide rod sections 4a and 4b are mutually locked.

Figure 7:
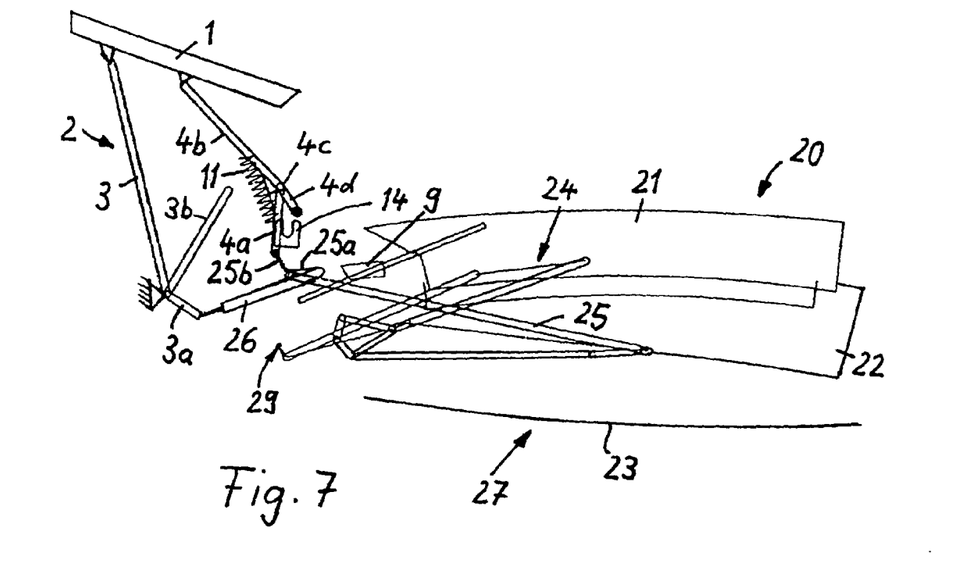

The vehicle roof 20 is adjusted, by actuation of its roof kinematic system 24, from the closed position shown in FIG. 6 to the stored position illustrated in FIG. 7. In the stored position, roof sections 21, 22, and 23 of the vehicle roof 20 form a stacked roof section bundle and are stowed in a rear storage compartment 27. The storage compartment 24, for example, forms a part of the vehicle trunk or also may be a separate cover compartment. As a result of the kinematic coupling between the roof kinematic system 24 and the multiple linkage kinematic system 2 for the cover element 1, with the assistance of the control cylinder 26 which acts as a transfer element, during the transitional motion of the vehicle roof from the closed to the stored position the cover element 1 as well is switched from the stored position shown in FIG. 6 to a raised, first intermediate position according to FIG. 7. In the first intermediate position, the cover element 1 is located outside the path of motion of the vehicle roof 20 and represents no obstacle in the transitional motion of the vehicle roof.

Figure 8:
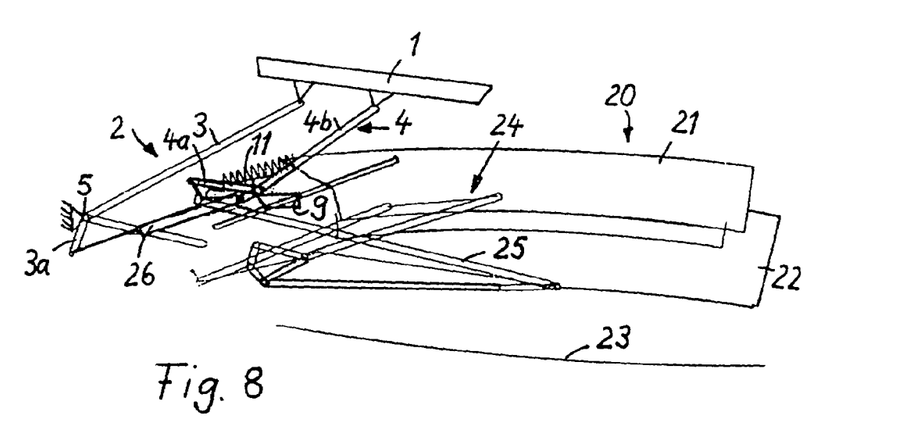
Figure 9:
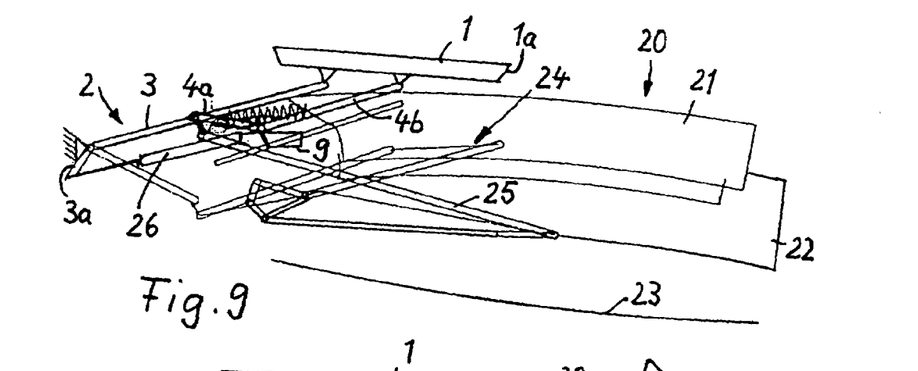

During the folding-away motion of the vehicle roof 20 and the simultaneously performed motion transfer to the cover element 1 or the multiple linkage kinematic system 2, the control cylinder 26, which is situated in the kinematic chain between the roof kinematic system 24 and the multiple linkage kinematic system 2, remains in an unchanged constant position, and thereby assumes the function of a rigid transfer guide rod. Only after the vehicle roof has reached its stored position does the control cylinder 26, as illustrated in FIG. 8, begin to extend outward, causing the multiple linkage kinematic system 2 and therefore also the cover element 1 to be moved from their raised, first intermediate position in the direction of the stored position. The vehicle roof 20, in contrast, remains motionless in the storage compartment of the vehicle. As the control cylinder 26 extends outward, section 3a on the one-part guide rod 3 for the multiple linkage kinematic system 2 is swiveled in the clockwise direction about the rotary joint 5 fixed to the body, thereby swiveling the cover element 1 from its raised, first intermediate position in the direction of its lowered, stored position. During this lowering motion, the lower guide rod section 4a of the two-part guide rod 4 for the multiple linkage kinematic system comes into contact with the stop 9 fixed to the body. As the control cylinder 26 continues the extension motion to its maximum elongated position (FIG. 9), the lower guide rod section 4a is pressed against the stop 9, thereby changing the relative angular position between the two guide rod sections 4a and 4b in favor of a larger relative angle. This change in angle occurs against the tensile force of the spring element 11. The change in the relative angular position between the two guide rod sections 4a and 4b causes the position of the cover element 1 to change; the rear edge 1a of the cover element is thereby lifted, causing the cover element 1 to assume an approximately horizontal position and be situated approximately parallel to the front roof section 21 of the vehicle roof 20. As a result, it is possible to achieve a more compact storage compartment for the roof section bundle, including the cover element 1.

Figure 10:
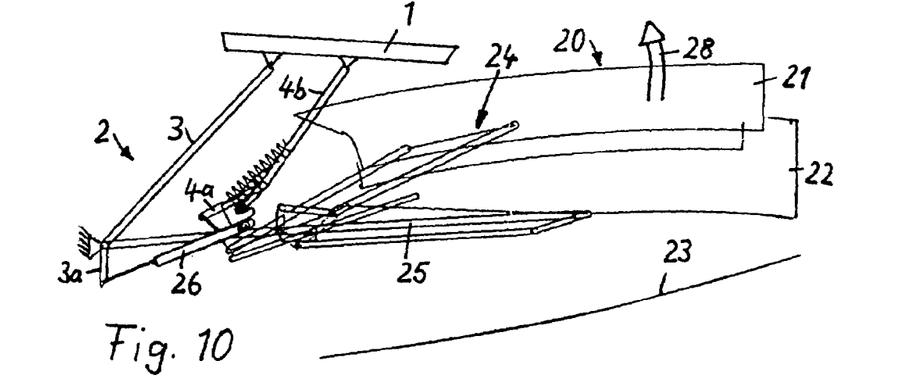

When the stored position of the cover element 1 is achieved, the front, one-part guide rod 3 for the multiple linkage kinematic system 2 for the cover element 1 comes into contact with a stop on one roof section of the vehicle roof 20. To achieve a loading assistance position, the vehicle roof 20, as illustrated in FIG. 10 and indicated by arrow direction 28, is lifted slightly from the stored position, thereby making the space beneath the roof section bundle accessible for stowing articles. During the lifting motion, the cover element 1 together with the vehicle roof is lifted as a result of the contact of the roof-side stop with the multiple linkage kinematic system 2; during the lifting motion the control cylinder 26 is switched without pressure or is kinematically decoupled, so that the lifting motion occurs exclusively via the roof kinematic system 24. When the roof is again lowered to achieve its stored position, the cover element 1 can likewise be moved back to its stored position by actuating the control cylinder 26 or as the result of its intrinsic weight.

Figure 11:
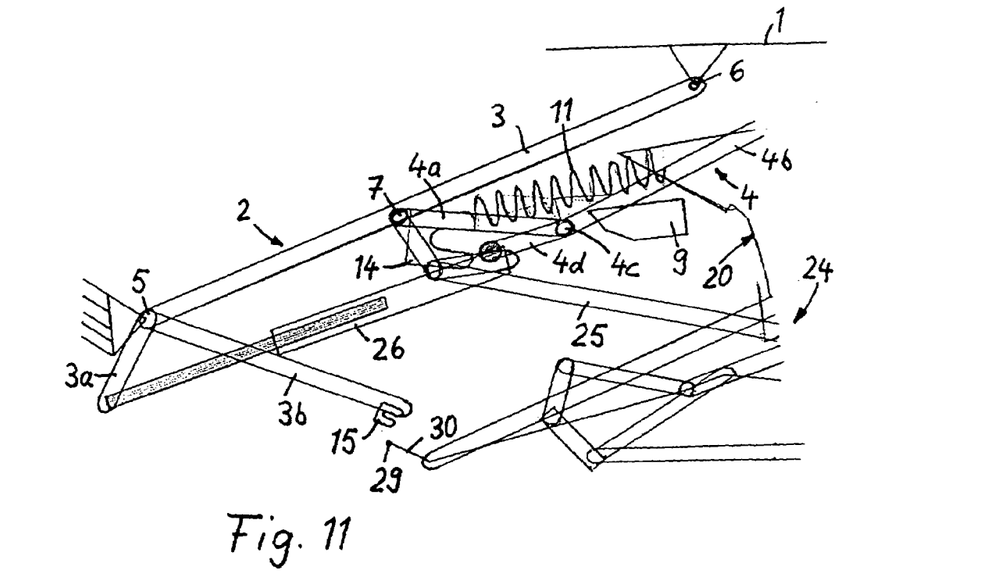
FIGS. 11 through 14 are a sectional enlargement of the region of the roof kinematic system and the multiple linkage kinematic system for the vehicle roof, or the rear shelf section, from FIGS. 6 through 10, but in a modified embodiment.

FIGS. 11 through 14 illustrate a sectional enlargement of the region of the multiple linkage kinematic system 2 and the roof kinematic system 24. As seen in FIG. 11, the stop is designed as a detent jaw 15 which is rigidly mounted to the end-face end of a section 3b, which may be designed as one piece with the guide rod 3 but which extends at an angle from the body-side rotary joint 5 of the guide rod 3. The detent jaw 15 cooperates with a guide pin 29 at the end of a guide rod 20 which is a component of the roof kinematic system 24 for the vehicle roof. In the position of the vehicle roof and the cover element 1 just before reaching the storage space, shown in FIG. 11, the detent jaw 15 and the guide pin 29 are in the disengaged position.

Figure 12:
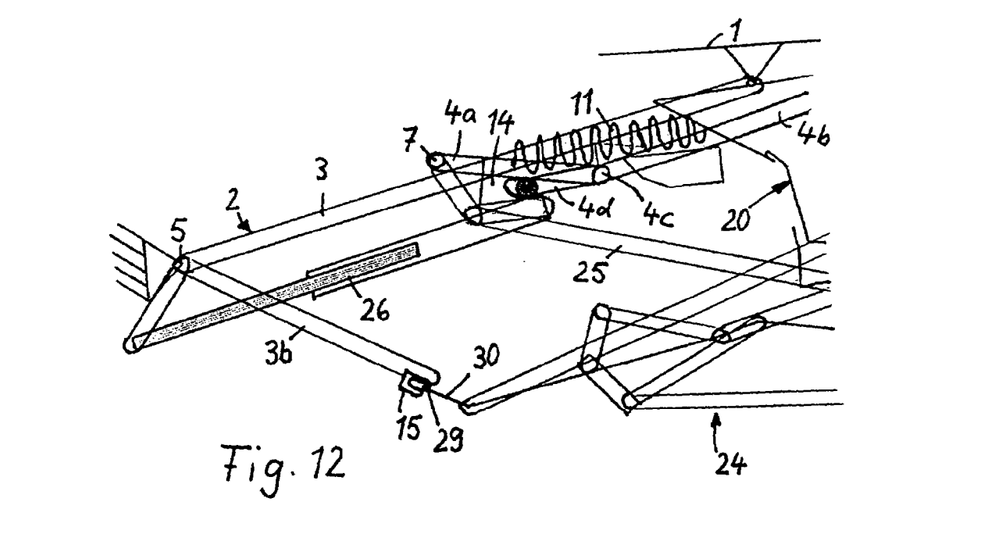
Figure 13:
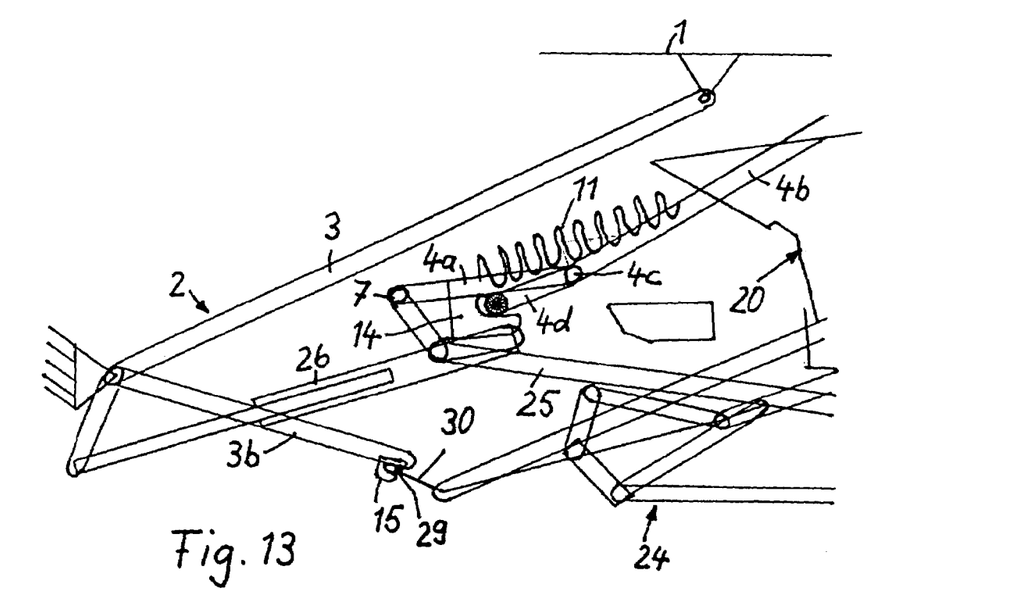
Figure 14:
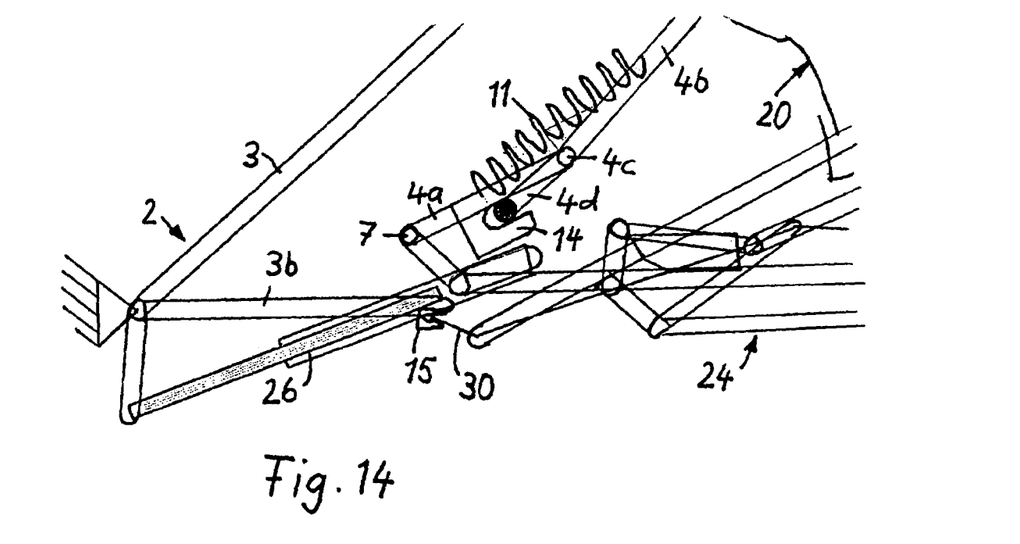

When switching to the loading assistance position of the vehicle roof, the stored roof section bundle is lifted by actuating the roof kinematic system 24, and in a first motion phase of the lifting motion the guide pin 29 engages in the recess of the detent jaw 15 as illustrated in FIG. 12. During the further lifting motion of the vehicle roof 20 according to FIGS. 13 and 14, as a result of the kinematic connection which now exists between the detent jaw 15 and the guide pin 29 the lifting motion is transferred via section 3b to the multiple linkage kinematic system, thereby moving the cover element 1 to the raised position, which corresponds to the loading assistance position. In a similar manner, as the vehicle roof is lowered in the direction of the stored position, also without actuation of the control cylinder 26 which is advantageously switched without pressure, the cover element 1 is forcibly switched again to the lowered stored position.

The locking between the two guide rod sections 4a and 4b of the two-part guide rod for the multiple linkage kinematic system 2 can also be seen in FIGS. 11 through 14. The sliding element 14 is movably mounted on the lower guide rod section 4a and may be adjusted with the assistance of a Bowden cable, which is actuated by the kinematic system for the cover element. The sliding element 14 has a detent jaw designed to receive the end face of section 4d, which is designed as one piece with the guide rod section 4b but which is situated on the side of the rotary joint 4c facing away from the cover element 1. In the stored position of the vehicle roof 20 and cover element 1, the sliding element 14 is in its retracted position, and the detent jaw in the sliding element 14 and the end face of section 4d are in the disengaged position, so that the two guide rod sections 4a and 4b on either side of the connecting rotary joint 4c are not yet locked.

When the trunk lid is closed in the roof storage cycle, the sliding element 14 is moved from its returned position in the direction of a position approximating that of the connecting rotary joint 4c. In this manner the detent jaw in the sliding element 14 achieves the engaged position with the end face of section 4d of the guide rod section 4b, thereby producing the lock between the guide rod sections 4a and 4b. As can further be seen in FIGS. 13 and 14, the locked position is maintained during the entire lifting motion to achieve the loading assistance position. The sliding element 14 and section 4d do not again become disengaged until the trunk lid is opened in the "close roof" cycle.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An adjustable cover element in a vehicle, in particular a convertible vehicle, which is mounted to a vehicle component by means of a multiple linkage kinematic system comprising:

two guide rods each of which on one end is coupled in an articulated manner to the vehicle component and on the other end is coupled in an articulated manner to the cover element;

one of the guide rods for the multiple linkage kinematic system having a two-part design further comprising two guide rod sections connected by an articulated joint, the rotational motion of the articulated joint between the two guide rod sections being limited in one rotational direction by an articulated stop;

wherein the relative angular position of the two guide rod sections with respect to one another is unchanged in a first phase of motion, and that a stop is provided which is located in the path of motion of the two-part guide rod, and which during a relative motion between the cover element and the stop acts on a guide rod section of the two-part guide rod in such a way that the angular position between the two guide rod sections changes in a second phase of motion.

2. The cover element according to claim 1, further comprising a spring element which spans the articulated joint that engages the two guide rod sections and acts on the guide rod sections in a predetermined direction about a rotational axis of the connecting articulated joint.

3. The cover element according to claim 1, wherein the angle between the two guide rod sections which are connected in an articulated manner increases when the stop acts on one of the guide rod sections.

4. The cover element according to claim 1, wherein the angle between the two guide rod sections which are connected in an articulated manner decreases when the stop acts on one of the guide rod sections.

5. The cover element according to claim 1, wherein the multiple linkage kinematic system is designed as a four-bar linkage kinematic system.

6. The cover element according to claim 1, further comprising an adjustable locking element mounted on one guide rod section that mutually locks the two guide rod sections in a defined angular position.

7. The cover element according to claim 6, wherein the locking element is a sliding element which is movably mounted on one guide rod section and which in the locked position surrounds a bolt on the second guide rod section.

8. The cover element according to claim 1, wherein the cover element is designed as a rear shelf section.

9. An adjustable vehicle roof which is to be adjusted between a closed position and a stored position, in which the vehicle roof is stored in a rear storage compartment, having a roof kinematic system by which the vehicle roof is supported on the vehicle body, and having a cover element which is situated adjacent to the storage compartment when the vehicle roof is stored, wherein during a control motion of the vehicle roof a first guide rod section of a two-part guide rod for the cover element cooperates with a stop in such a way that the angle between the first guide rod section and a second guide rod section changes.

10. The vehicle roof according to claim 9, wherein to achieve a loading assistance position the stowed vehicle roof is to be adjusted to a raised position inside the rear storage compartment, the first guide rod section of the two-part guide rod coming into contact with the stop during the transition of the vehicle roof to the closed position.

11. The vehicle roof according to claim 10, wherein the stop is designed as a detent jaw which surrounds a guide pin in the transition to the loading assistance position, the detent jaw and guide pin being situated on a multiple linkage kinematic system of the cover element or on the roof kinematic system.

12. The vehicle roof according to claim 10, wherein the detent jaw is situated on a guide rod of the kinematic system for the cover element designed as a rear shelf section, and the guide pin is situated on a separate guide rod of an additional roof section.

13. The vehicle roof according to claim 9, wherein the roof kinematic system and a multiple linkage kinematic system for the cover element are kinematically coupled, so that during the control motion of the vehicle roof the cover element also undergoes a control motion, and the first guide rod section of the two-part guide rod for the cover element cooperates with the stop.

14. The vehicle roof according to claim 13, wherein the roof kinematic system and the multiple linkage kinematic system for the cover element are coupled via a control cylinder.

15. The vehicle roof according to claim 14, wherein after the stored position is achieved, the control cylinder is actuated so that the cover element reaches an end position.

16. The vehicle roof according to claim 9, wherein the stop is rigidly mounted on the vehicle body.

17. The vehicle roof according to claim 9, wherein the stop is movable relative to the vehicle body.

18. The vehicle roof according to claim 9, wherein the stop is located on an adjustable vehicle component.

19. The vehicle roof according to claim 18, wherein the stop is located on a roof section or on the roof kinematic system.

20. The vehicle roof according to claim 18, wherein the stop is located on a component of the cover element.

21. The vehicle roof according to claim 9 wherein the stop is designed as a sliding track.

* * * * *